United States Patent
Lundgren

(10) Patent No.: US 7,563,429 B2
(45) Date of Patent: Jul. 21, 2009

(54) METHOD OF RECYCLING AN EXHAUSTED SELENIUM FILTER MASS

(75) Inventor: Yngve Lundgren, Skellefteå (SE)

(73) Assignee: Outotec Oyj, Espoo (FI)

( * ) Notice: Subject to any disclaimer, the term of this patent is extended or adjusted under 35 U.S.C. 154(b) by 459 days.

(21) Appl. No.: 10/583,247

(22) PCT Filed: Dec. 16, 2004

(86) PCT No.: PCT/FI2004/000768

§ 371 (c)(1),
(2), (4) Date: Jun. 16, 2006

(87) PCT Pub. No.: WO2005/058462

PCT Pub. Date: Jun. 30, 2005

(65) Prior Publication Data

US 2007/0007878 A1    Jan. 11, 2007

(30) Foreign Application Priority Data

Dec. 17, 2003 (SE) ..................... 0303391

(51) Int. Cl.
*B01D 53/64* (2006.01)
*C01B 19/00* (2006.01)

(52) U.S. Cl. ................ 423/508; 423/509; 423/510; 423/99; 423/101; 423/103; 423/106; 423/109; 423/110

(58) Field of Classification Search ............ 423/99, 423/101, 103, 106, 109, 110, 508, 509, 510
See application file for complete search history.

(56) References Cited

U.S. PATENT DOCUMENTS

| | | | | |
|---|---|---|---|---|
| 3,786,619 A | * | 1/1974 | Melkersson et al. | ............ 95/134 |
| 3,932,149 A | * | 1/1976 | Melkersson | .................. 95/205 |
| 6,129,779 A | * | 10/2000 | Bohland et al. | ................ 75/714 |

FOREIGN PATENT DOCUMENTS

| EP | 0 629 431 A1 | 12/1994 |
|---|---|---|
| EP | 0 655 794 A1 | 5/2005 |

* cited by examiner

*Primary Examiner*—Roy King
*Assistant Examiner*—Xiaobei Wang
(74) *Attorney, Agent, or Firm*—Buchanan Ingersoll & Rooney PC

(57) ABSTRACT

A process for reclaiming spent selenium filter mass containing an inert material. The spent mass is treated with a hydrogen peroxide solution for leaching out selenium content from unspent active substance present in the filter mass to form selenious acid. The filter mass is treated with aqua regia solution to dissolve mercury selenide present in the mass. The aqua regia solution is separated from the mass and isolated. Suitably, the filter mass, which now contains inert carrier material, is transferred with the isolated selenious acid, to production of new selenium filter mass. After partial neutralization of the aqua regia solution, mercury is precipitated out for disposal. Before this, elemental selenium can be separated from the aqua regia solution by adjusting the pH level and used advantageously for production of new filter mass. Thusly, reclaimed selenium content and inert carrier material can be advantageously used for production of new selenium filters.

22 Claims, 1 Drawing Sheet

METHOD OF RECYCLING AN EXHAUSTED SELENIUM FILTER MASS

BACKGROUND

1. Field

Disclosed herein is a process for reclaiming spent selenium filter mass containing an inert material, following take-up of mercury by a substance which contains selenium and is present in the filter mass. Selenium is present in spent selenium filters, both in unspent active filter mass, mainly as elemental selenium, and in reacted filter mass as mercury selenides.

2. Description of Related Art

Selenium filters are being used for taking up gaseous elemental mercury, normally in small amounts, from gases and contain a filter mass consisting of an active substance of elemental selenium, selenium sulphide or some other active selenium compound which is capable of reacting with elemental mercury. The main portion of the filter mass consists of a carrier of an inert material, which may consist of silica, aluminium oxide, or a ceramic material. Such a filter, which has been in general use for various purposes for about thirty years, is disclosed in U.S. Pat. No. 3,786,619 which also teaches a suitable method for making the filter.

In use of the filter, the active substance is gradually consumed, forming mercury selenide, and after operation over a period of time the performance of the filter will be reduced so much that its ability to take up mercury and perform the cleaning is no longer adequate. The filter mass is then replaced with fresh filter mass and the spent filter mass must be disposed of in a suitable manner. Such disposal is costly in itself and also requires payment of waste tipping fees. In addition, the disposal often causes problems for several other reasons, e.g., environmentally, and both the carrier material and the active substance are of considerable value. As indicated initially, the used filter mass contains some unspent selenium-containing active substance, while the remainder of the selenium content of the active substance has reacted with mercury to form mercury selenide, which is a very stable compound.

Typically, the spent filter mass may contain 1 to 5% by weight of Hg and may still contain 3 to 5% by weight of unspent elemental selenium.

This being so, a reprocessing method for reclaiming the active substance and/or the carrier material is highly desirable. It is also desirable to be able to separate mercury contained in the filter mass from the inert carrier so that the amount of material that has to be deposed disposed of is as small as possible, e.g. to reduce the costs for the deposition disposal.

Previously, methods have been proposed for processing mercury-containing waste at relatively high temperatures and in the presence of selenium to remove the mercury of the waste in the form of gaseous selenides. In such a method, primarily developed for used button-type batteries, which is described in EP 0655794, the batteries are treated in a rotary furnace at about 800° C. in the presence of selenium to evaporate mercury in the form of selenide, thereby making the batteries harmless.

Such prior art methods for the destruction of mercury-containing materials are not useful or even feasible for processing spent selenium filter masses, particularly so if the filter masses are to be reclaimed, because capture of mercury existing as elemental mercury, $Hg^0$, and as selenide, HgSe, will be problematic. Separation of the selenium for reclaiming will also be troublesome.

SUMMARY

Disclosed herein is a process by which spent selenium filter masses can be reprocessed, in a manner that is both economically and environmentally acceptable, for reclaiming both the selenium and the filter mass. With such a process, a spent selenium filter mass can be cleaned and reused, while, captured mercury contained in the filter mass can be separated and disposed of in a suitable stable form.

To that end, the filter mass is treated in the steps which are set forth herein. In the course of the reclaiming process, the used and spent selenium filter mass is first treated with a hydrogen peroxide solution, suitably having a concentration of about 50%, for leaching out essentially all of the unspent active substance in the filter mass, which is obtained in the form of selenious acid. The resulting selenious acid is then separated and isolated. Then, this selenious acid is advantageously transferred to an installation for producing new selenium filter mass.

The filter mass that has been freed from the solution is then treated with aqua regia, preferably at an elevated temperature, for dissolving essentially all of the mercury selenide contained in the mass. The remaining filter mass, which is mainly formed of the inert carrier, remains essentially undissolved. The aqua regia solution with the content of mercury dissolved in it and selenium from the dissolved mercury selenide are separated from the filter mass and isolated.

Suitably, the aqua regia solution is heated and aerated to evaporate any excess of aqua regia. If it is desired to reclaim selenium from the solution, $SO_2$ is introduced into the solution after a partial neutralisation by suitable pH adjustment, resulting in precipitation of selenium as elemental selenium, Se(s), that can be used to produce selenious acid for use, if desired, in the production of new filters. After further partial neutralisation of the solution, the mercury can be precipitated in the form of some poorly soluble compound other than selenide, such as sulphide. Thus, the solution can reprocessed for reclaiming the selenium it contains, and the mercury content can also be obtained in a form that is suitable for disposal in an environmentally safe manner. Such reprocessing is not always possible or desirable, however, and, after neutralisation, the mercury and the selenium contained in the solution will then be precipitated as HgSe, so that mercury is taken care of for disposal in that very stable form. As indicated, it is preferred, however, to obtain the selenium for reuse and dispose of the mercury in a different stable form, such as sulphide.

Being now essentially free from the aqua regia solution and only containing inert material, the filter mass is washed and dried and then, like the previously separated selenious acid, forwarded to production of new selenium filter mass.

BRIEF DESCRIPTION OF DRAWING

The invention will now be described as a preferred embodiment illustrated in the FIGURE which is a diagrammatic flow chart of a process according to the invention.

DETAILED DESCRIPTION OF SPECIFIC EMBODIMENTS

Figure 1:
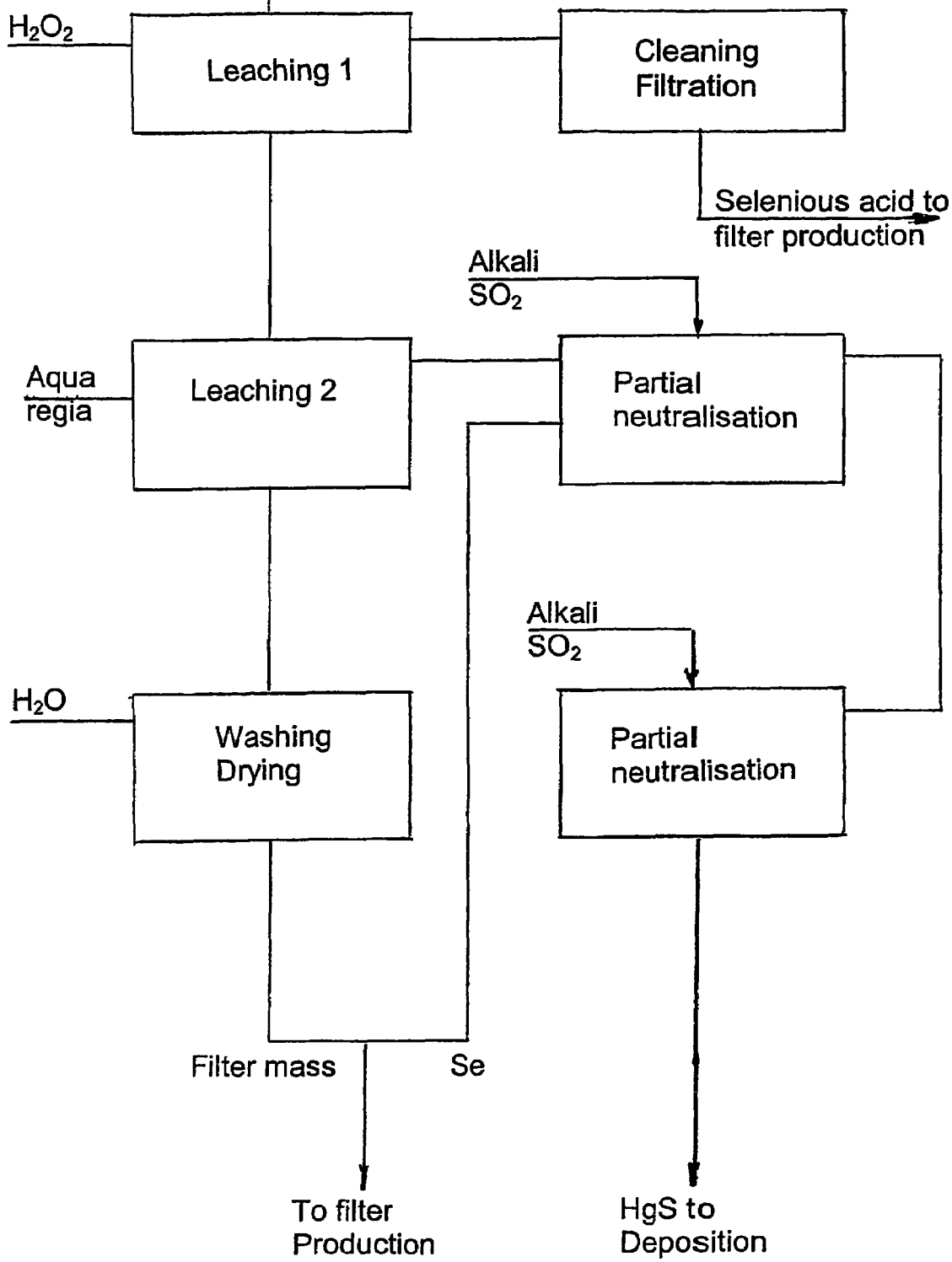

The selenium filter mass is first fed to a tank for "Leaching 1", in which the filter mass is leached with about 50% hydrogen peroxide, $H_2O_2$, for leaching out selenium, that is, the unspent content of selenium, not bound to mercury, of the active filter mass. This leaching, which can be carried out in several steps, results in formation of selenious acid, $H_2SeO_3$, which can be used as a starting material in the production of a selenium filter mass as is disclosed in the previously mentioned U.S. Pat. No. 3,786,619. A solution containing selenious acid is thus obtained and forwarded to a purifying and filtering unit from which pure selenious acid is further transferred to an installation for the production of selenium filter masses.

The leach residue from "Leaching 1", that is, the remaining filter mass with its content of mercury selenide, is then subjected to another leaching step in "Leaching 2". In this leaching, which is carried out with aqua regia, that is, concentrated nitric acid mixed with three times as much of concentrated hydrochloric acid, the solid mercury selenide will be dissolved while forming a solution containing selenium and mercury in ionic form. Optionally, the leach tank may be heated so that the leaching takes place at an elevated temperature. The leaching is carried on until all or at least almost all of the mercury selenide content has been dissolved.

The solution with its dissolved content of mercury and selenium is separated from the leach residue, which is essentially formed by the inert carrier of the mass. The leach residue is withdrawn and washed with water and dried so that a suitable carrier raw material for the production of filter masses is obtained, whereupon it is forwarded to an installation for such production.

The solution of aqua regia from "Leaching 2" is heated and blown with air for removing excess aqua regia, whereupon the solution is partially neutralised in two steps so that the selenium can first be precipitated with $SO_2$ while forming Se(s), whereupon the precipitate of elemental selenium is separated from the solution. Using sodium sulphide or a different sulphide, mercury is then precipitated as HgS which can be separated and withdrawn for disposal.

After suitable purification, the precipitate of elemental selenium, Se(s), from the neutralisation step can be brought to the installation for filter production.

The specific embodiments of the process described herein will now be described in more detail, and in particular from an environmental and economical point of view, and with reference to a non-limiting example.

It can be estimated that a spent filter mass contains at most 125 kg of mercury per cubic meter. When transformed to HgS of a density of 8100 $kg/m_3$, a volume of about 18 liters of fine-grained sludge is obtained. Even if small amounts of other substances should accompany the precipitate, the volume will not exceed 50 liters. That is, the volume of mercury-containing waste to be disposed of will only be about 5% of the original volume. Thus, the need for disposal is reduced to one twentieth when spent selenium filters are reprocessed in accordance with the invention. If the selenium of the mercury selenides formed is reclaimed, there are basically no selenium wastes and attendant losses.

The cost reduction obtained by the process according to the invention is substantial. A direct conversion based on the volume would thus result in a reduction of the disposal cost by as much as 95%. The reuse of the cleaned carrier mass also means a great cost reduction.

EXAMPLE

In preliminary tests, leaching of the filter mass was carried out with an initial Hg content of 2.72% and an initial Se content of 5.5%. Leaching 1 using hydrogen peroxide resulted in leaching out of a total of 72% of the selenium contained in the filter mass. In a following Leaching 2 using aqua regia, 99% of the mercury content and also 25% of the original selenium content could be leached out. The solution was neutralised, and selenium and mercury were precipitated as sulphides. After the precipitation the solution contained <0.001% of the original content of mercury and 2.5% of the original content of selenium. After washing of the leached mass, the mass contained only 0.2% Hg of the original content, corresponding to a mercury content in the fully leached mass of about 0.005%. These tests thus show that it is possible selectively to leach out the selenium which can then be returned to production of selenium filter masses. The leaching out of mercury has also been found to be effective, and the process according to the invention has reduced the volume to be disposed of as mercury sulphide to about one eightieth of the original volume.

The invention having been described herein by reference to certain specific embodiments, it will be understood that such description and embodiments are not limiting of the appended claims.

The invention claimed is:

1. A process for reclaiming spent selenium filter mass comprised of an inert material, residual selenium active substance and mercury selenide, said process comprising:
   treating the spent selenium filter mass with a hydrogen peroxide solution for leaching out the selenium content in essentially all of the residual selenium active substance so as to form selenious acid and treated spent selenium filter mass;
   separating the selenious acid from the treated spent selenium filter mass;
   contacting the treated spent selenium filter mass with aqua regia solution, thereby dissolving essentially all the mercury selenide and producing a treated spent mercury selenide-depleted filter mass;
   separating the aqua regia solution containing the dissolved mercury selenide from the treated spent mercury selenide-depleted filter mass; and
   precipitating the mercury in disposable form from the aqua regia solution containing the dissolved mercury selenide to produce a mercury-depleted aqua regia solution, and
   separating the precipitated mercury from the mercury-depleted aqua regia solution.

2. The process of claim 1, wherein the precipitating the mercury in disposable form from the aqua regia solution containing the dissolved mercury selenide comprises adjusting the pH of the aqua regia solution containing the dissolved mercury selenide, thereby precipitating elemental selenium and further comprising using the precipitated elemental selenium to prepare new selenium filter mass.

3. The process of claim 2, wherein the adjusting of the pH of the aqua regia solution containing the dissolved mercury selenide is carried out at an elevated temperature.

4. The process of claim 1, wherein the precipitating the mercury in disposable form from the aqua regia solution containing the dissolved mercury selenide comprises adjusting the pH of the aqua regia solution at an elevated temperature.

5. The process of claim 4, further comprising:
   washing and drying the treated spent mercury selenide-depleted filter mass after separating it from the aqua regia solution, and
   using the washed and dried filter mass to prepare new selenium filter mass.

6. The process of claim 3, further comprising:
   washing and drying the treated spent mercury selenide-depleted filter mass separated from the aqua regia solution, and
   using the washed and dried filter mass to prepare new selenium filter mass.

7. The process of claim 2, further comprising:
washing and drying the treated spent mercury selenide-depleted filter mass separated from the aqua regia solution, and
using the washed and dried filter mass to prepare new selenium filter mass.

8. The process of claim 1, further comprising:
washing and drying the treated spent mercury selenide-depleted filter mass separated from the aqua regia solution, and
using the washed and dried filter mass to prepare new selenium filter mass.

9. The process of claim 8, further comprising:
using the selenious acid separated from the treated spent selenium filter mass selenium filter mass.

10. The process of claim 7, further comprising:
using the selenious acid separated from the treated spent selenium filter mass to prepare new selenium filter mass.

11. The process of claim 6, further comprising:
using the selenious acid separated from the treated spent selenium filter mass to prepare new selenium filter mass.

12. The process of claim 5, further comprising:
using the selenious acid separated from the treated spent selenium filter mass to prepare new selenium filter mass.

13. The process of claim 4, further comprising:
using the selenious acid separated from the treated spent selenium filter mass to prepare new selenium filter mass.

14. The process of claim 3, further comprising:
using the selenious acid separated from the treated spent selenium filter mass to prepare new selenium filter mass.

15. The process of claim 2, further comprising:
using the selenious acid separated from the treated spent selenium filter mass to prepare new selenium filter mass.

16. The process of claim 1, further comprising
using the selenious acid separated from the treated spent selenium filter mass to prepare new selenium filter mass.

17. The process of claim 1, wherein the disposable form of mercury is HgSe.

18. The process of claim 1, wherein the disposable form of mercury is HgS.

19. The process of claim 18, wherein the HgS is formed by adding sulphide to the aqua regia solution.

20. The process of claim 19, wherein the sulphide comprises sodium sulphide.

21. The process of claim 19, wherein the sulphide is added to a partially neutralized aqua regia solution.

22. The process of claim 1, further comprising adding $SO_2$ to the aqua regia solution containing the dissolved mercury selenide, precipitating elemental selenium, and separating the precipitated elemental selenium from the aqua regia solution containing the dissolved mercury selenide.

* * * * *

UNITED STATES PATENT AND TRADEMARK OFFICE
CERTIFICATE OF CORRECTION

PATENT NO. : 7,563,429 B2  Page 1 of 1
APPLICATION NO. : 10/583247
DATED : July 21, 2009
INVENTOR(S) : Yngve Lundgren It is certified that error appears in the above-identified patent and that said Letters Patent is hereby corrected as shown below:

Column 1, Line 49: delete "disposed"; delete "of" [should read: amount of material that has to be deposed is as . . .].

Column 5, Line 15: add --to prepare new-- [should read: selenium filter mass to prepare new selenium filter mass . . .].

Signed and Sealed this

Seventeenth Day of November, 2009

David J. Kappos
*Director of the United States Patent and Trademark Office*